Figure 1:
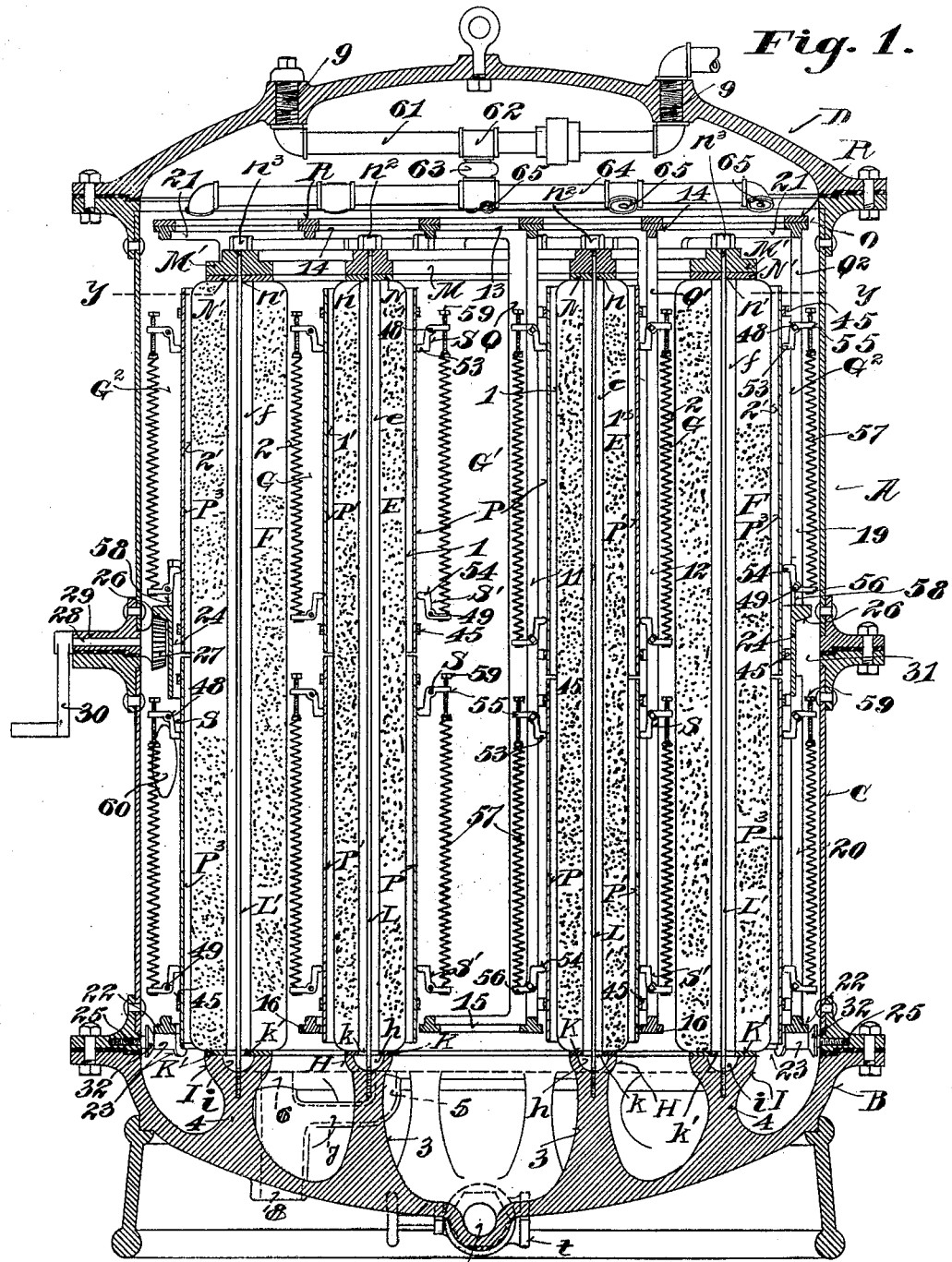

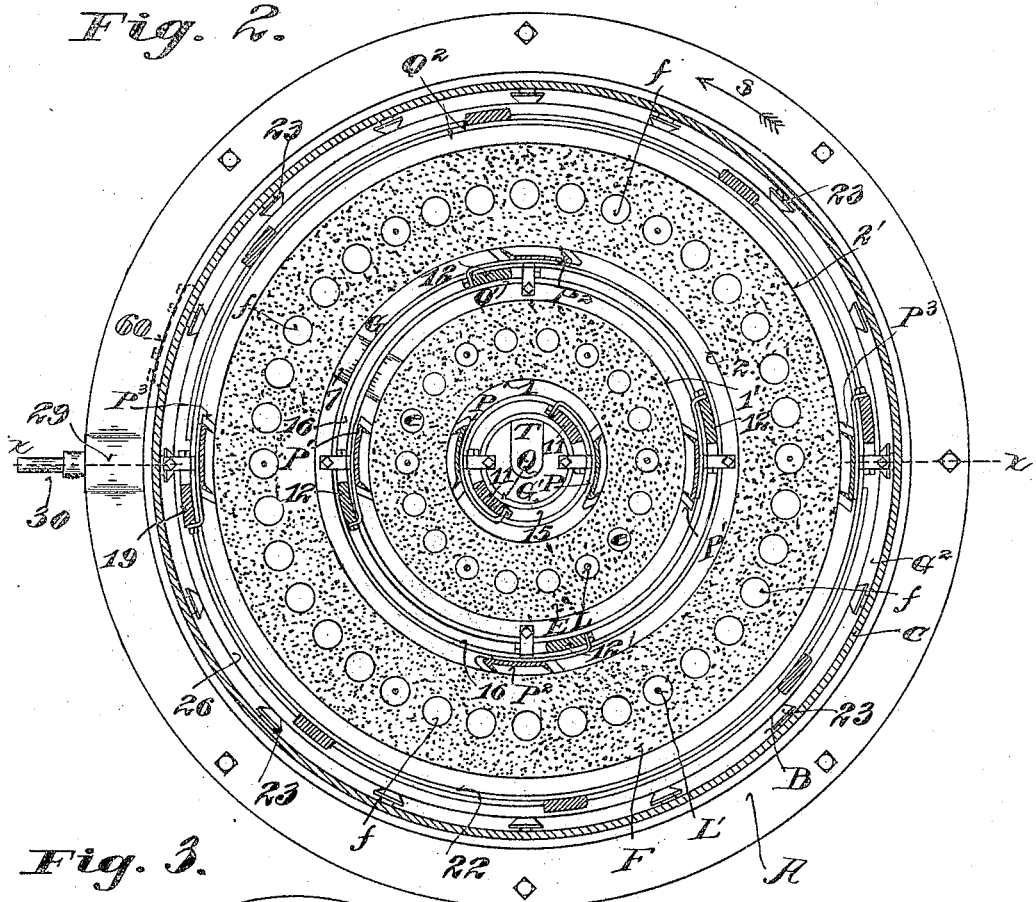

No. 803,239. PATENTED OCT. 31, 1905.
M. N. LYNN.
WATER FILTER.
APPLICATION FILED MAY 3, 1905.
3 SHEETS—SHEET 3.
Fig. 4. Fig. 5.
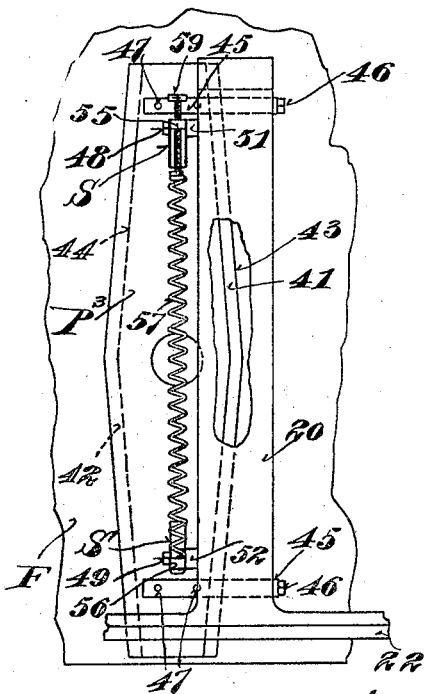
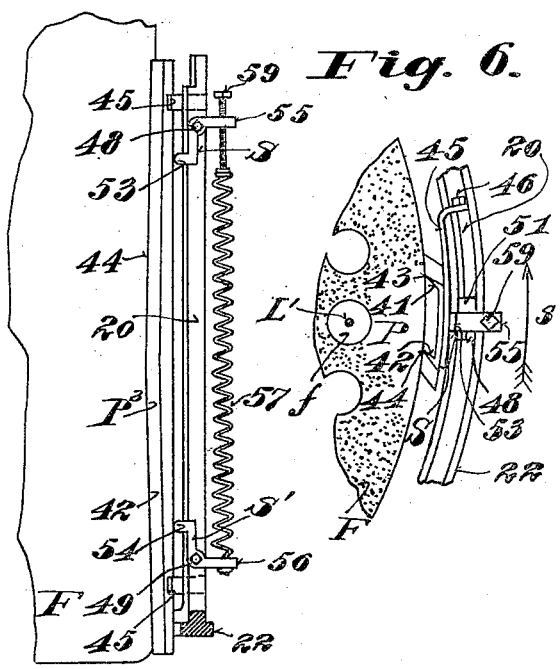
Fig. 6.
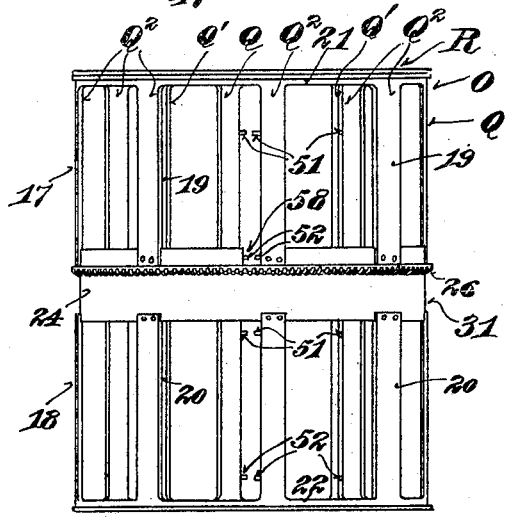
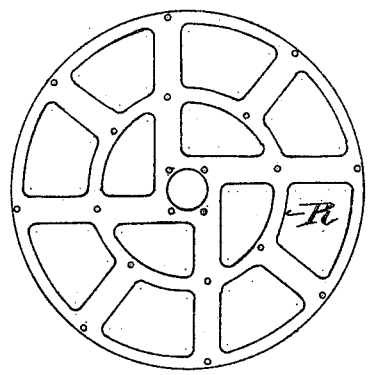
Fig. 7. Fig. 8.
Witnesses. Inventor.

UNITED STATES PATENT OFFICE.

MIRABEAU NORMAN LYNN, OF CINCINNATI, OHIO, ASSIGNOR TO THE LYNN FILTER MANUFACTURING COMPANY, OF CINCINNATI, OHIO, A CORPORATION OF OHIO.

WATER-FILTER.

No. 803,239.　　　　Specification of Letters Patent.　　　　Patented Oct. 31, 1905.

Application filed May 3, 1905. Serial No. 258,661.

*To all whom it may concern:*

Be it known that I, MIRABEAU NORMAN LYNN, a citizen of the United States, residing at Cincinnati, in the county of Hamilton and State of Ohio, have invented certain new and useful Improvements in Water-Filters, of which the following is a specification.

My invention relates to water-filters of the character in which the water to be filtered is passed through the filtration stone or medium under pressure, usually the pressure of a city or other water service, the filtration stone or medium usually being the natural stone or composition formed, baked, or made in imitation thereof or for serving a similar function. Filters of this character are known in the trade as "stone filters," the filtering medium thereof being self-contained—that is, needing no outer support for holding the mass in shape.

My present invention is an improvement upon the water-filter shown, described, and claimed in my application, Serial No. 252,217, filed March 27, 1905.

It is the object of my invention to provide a water-filter capable of having a maximum filtering-surface within a minimum compass, to arrange the filtering-stones or other filtering mediums thereof in novel manner for increasing the filtration capacity, and provide such filter with novel cleaning and flushing devices, and the invention will be readily understood from the following description and claims and from the drawings, in which latter—

Figure 1 is a central longitudinal section of my improved device, taken on a line corresponding to the line $x\ x$ of Fig. 2. Fig. 2 is a cross-section of my improved device, taken on the line $y\ y$ of Fig. 1. Fig. 3 is a plan view of the base. Fig. 4 is an enlarged side elevation showing the scraper-mounting, the filtering-cylinder being shown broken. Fig. 5 is an end view, and Fig. 6 a plan view, of the same. Fig. 7 is a side elevation of the scraper-frame with the scrapers removed. Fig. 8 is a plan view of the spider of the scraper-frame, and Fig. 9 is a sectional detail of the roll-support for the scraper-frame.

A represents the casing, which may be of any suitable form, but which I prefer to comprise a base B, barrel C, and cap D, suitably secured together.

Within the casing suitable hollow bodies or cylinders of filtering stone, composition, or similar material are disposed one in the other. Thus I have shown an inner filtering-cylinder E and an outer filtering-cylinder F. I prefer to arrange the cylinders concentrically with relation to each other. The walls of said filtering bodies or cylinders form the filtering medium, and said filtering bodies or cylinders have interspace G therebetween, into which the unfiltered water takes, the unfiltered water also taking into the inner space $G'$ in the inner cylinder and the outer space $G^2$ between the outer cylinder and the wall of the casing. Each of these cylinders may have its wall provided with internally-disposed longitudinal cores or apertures, as shown at $e\ f$, these longitudinal apertures providing the passage into which the filtered water is received and from which it is led to a suitable point for use, the water to be filtered taking against the respective inner and outer surfaces 1 1' 2 2' of the walls of the filtering-cylinders and the water being filtered passing transversely through said bodies into said internal longitudinal apertures.

For supporting the filtering-cylinders I provide the base with supports H I, (shown of annular form,) respectively supported from the base on the pedestals 3 4. Grooves $h\ i$ are in the top of the respective supports for forming channels for the filtered water received from the respective apertures $e\ f$, and the respective grooves $h\ i$ may be tapped by passages 5 6, which passages may be connected by a passage 7, and the filtered water may be taken from the filter through a discharge-opening 8 in the filter-casing. The water to be filtered is received through one or more supply-openings 9. These openings 8 and 9 may be provided with suitable valves.

Gaskets K K' are interposed between the respective filtering-cylinders and their supports, the respective gaskets having openings $k\ k'$ registering with the respective apertures $e\ f$. Rods L L' are suitably secured to the respective supports H I, as by being threaded thereto, and take through selective apertures $e\ f$. Rings M M' are respectively placed above the cylinders, gaskets N N', having openings $n\ n'$ for the rods, being interposed between the respective rings and cylinders. Nuts $n^2\ n^3$ take over the respective rods and securely clamp the respective cylinders upon their respective supports. The gaskets form water-tight cushions for the cylinders and compel the filtered water in the longitudinal apertures in the cylinders to pass to their discharge-passages.

The filter is provided with a cleaning device. This in the form shown comprises a frame O, to which scrapers P, P', P², and P³ are secured. The frame comprises supports Q Q' Q², preferably annular and concentrically arranged, forming annular frames The inner ones of these annular supports preferably respectively comprise posts 11 12, connected, respectively, at top by annular webs 13 14 and at bottom by annular webs 15 16. The outer one of these annular supports preferably consists of end sections 17 18, respectively having posts 19 20, the upper posts 19 being connected by a web 21, the lower posts 20 being connected at bottom by a web 22, forming an annular track upon which the scraper-frame is supported on rollers 23, arranged about the interior of the casing. The respective posts 19 20 are secured to an annular rack-piece 24, located intermediate of the ends of the scraper-frame. The supports are connected by a spider R, forming a rigid scraper-frame, preferably in the form of an inverted basket resting on the rollers 23. The rollers are mounted on studs 25, secured to the scraper-frame, and, with the web 22, form an antifriction-runway for the scraper-frame. The support Q supports the scrapers P in the inner space G', the support Q' supports the scrapers P' P² in the interspace G, and the support Q² supports the scrapers P³ in the outer space G². The support Q² is provided with an annular toothed rack 26, with which a pinion 27 on a shaft 28, journaled in a bearing 29 in the casing, meshes, the shaft 28 being provided with an operating-handle 30. This rack is shown on the rack-piece 24, the parts forming an annular recess 31 for accommodating the pinion 27. The annular rack is at the outside and the scrapers P³ are to inside of said support Q². For centering the scraper-frame with relation to the filtering-cylinders, so that all the scrapers may properly contact all the cylinders, I provide the rollers 23 with flanges 32, preferably beveled, the flanges taking against the scraper-frame for positioning the latter.

The scrapers are preferably of the form shown, described, and claimed in my application, Serial No. 227,480, filed October 6, 1904. They are respectively preferably provided with a forward flange 41 and a rear flange 42, projected at an angle to the radius of the scraper-frame, the respective flanges having contact edges 43 44 taking against the respective filtering-cylinders, the contact-lines extending longitudinally at an angle to the vertical axis of the cylinder for taking against the cylinder-surface and removing the deposit therefrom with a shear cut. The scrapers are shown as having plow-shaped scraping edges, the scraping edges being farthest apart at the middle of the respective scrapers and converging toward the ends of the several scrapers. The respective scrapers are secured to the webs by preferably resilient metal straps 45, secured to the supports by bolts 46 and to the scrapers by rivets 47, the connection between the straps and the scrapers being preferably at the fore part of the scrapers, the scrapers following the straps in rotating, the direction of rotation being as indicated by the arrows s and constituting the scrapers dragging scrapers.

For urging the scrapers toward the cylinders I provide bell-crank levers S S', pivoted, respectively, at 48 49 to lugs 51 52 on the supports, the toes 53 54 of which levers bear against the scrapers, their heels 55 56 being connected by a spring 57, shown as a helical or coil spring, connected to the heel 56 through an aperture in the latter and to the heel 55 by take-up bolt 59, threaded, preferably with a loose fit, into the heel 55, to which take-up bolt the spring is swiveled, the take-up bolt permitting adjustment of tension of the spring. The toes of the springs bear against the scrapers between the scraping edges of the scrapers, and the springs equalize pressure at both ends of the scraper. The springs may be adjusted by removing the top and reaching the bolt-heads by a suitable long-stemmed wrench, or suitable hand-holes may be left in the casing or top. (See the hand-hole closed by the removable cap 60.)

The scrapers P' P³ are urged inwardly against the outer surfaces of the filtering-cylinders, and the scrapers P P² are urged outwardly against the inner surfaces of the said cylinders, the said scrapers P² P' being both carried on the support Q' and urged, respectively, outwardly and inwardly against the respective inner and outer surfaces of the respective cylinders, the said support Q' and the scrapers P² P' traveling in the interspace between said cylinders. In the form shown the scrapers P² P', urged, respectively, outwardly and inwardly, are carried by a common support between the cylinders, permitting the interspace between said cylinders to be narrow. The construction of scrapers and the means for causing their contact with the cylinders take up little transverse space, permit adjustment of impact against the cylinders, and permit the filter to be built transversely compact without sacrifice of capacity.

In cleaning the filter the water may be discharged through a flushing-opening T in the casing provided with the flushing-valve t.

The supply-openings 9 may be connected by a pipe 61, having a central outlet, as in a coupling 62, at which there is a swivel-coupling 63, connecting with a pipe 64, having outlet-openings 65 projected at an angle to the perpendicular. When the flushing-valve is opened, the water will discharge from the filter, permitting the pipe 64 to turn on the swivel-coupling by reason of the force of the supply being directed through the angled outlet-openings 65, thereby reaching the various parts of the filtering-surfaces of the cylinders and creating a swirl or whirl in the water in the casing for aiding in flushing the cylinders, the scrapers being meanwhile turned for removing the deposit from the surface of the cylinders. It will be noted that in my improved device the water to be filtered preferably takes against both faces of the walls of all the cylinders, fills the interspace between the cylinders, equalizes or balances the pressure against all the exposed surfaces of the cylinder, and causes the water-pressure to be exerted from both sides of the walls of the cylinders toward the filtered-water apertures in their interiors, the cylinders being disposed one in the other for having alternate filtered and unfiltered passages, thereby enabling the area of filtering-surfaces to be largely increased, the cleaning devices being compactly constructed and operated by gearing greatly multiplying the power applied.

In the drawings I have shown two filtering-cylinders, one within the other, with their cleaning devices also one within the other; but it is obvious that their number may be increased without departing from the spirit of my invention. Filtering mediums of the character mentioned are usually fragile; but in my improved construction they are relieved of undue strain, the water-pressure upon both sides of the respective cylinders and between cylinders being equal.

If desired, the annular rack-piece 24 may have openings 58 for accommodating the outer bell-cranks positioned adjacent to said rack-piece.

Having thus fully described my invention, what I claim as new, and desire to secure by Letters Patent, is—

1. In a water-filter, the combination with a containing-casing, of a plurality of hollow self-contained filtering bodies and cleaners therefor disposed one in the other, said cleaners impinging against all the sides of all of said hollow self-contained filtering-bodies, and means for causing relative rotation between said hollow self-contained filtering bodies and cleaners in regular predetermined rotary paths.

2. In a water-filter, the combination with a containing-casing, of a plurality of hollow self-contained filtering-cylinders and cleaners therefor disposed one in the other, said cleaners impinging against all the sides of all of said hollow self-contained filtering-cylinders, said hollow self-contained filtering-cylinders and cleaners maintained in predetermined longitudinal positions relatively to each other, means for causing relative rotation between said cylinders and cleaners, supplying means for the water to be filtered, and discharging means for the filtered water.

3. In a water-filter, the combination with a containing-casing, of a pair of self-contained filtering-cylinders disposed one in the other, and cleaners therefor, a common support for said cleaners guiding the path of travel of said cleaners, said support and cleaners located between the outer surface of said inner cylinder and the inner surface of said outer cylinder, means for causing relative rotation between said cylinders and cleaners, supplying means for the water to be filtered, and discharging means for the filtered water.

4. In a water-filter, the combination, with a casing, of concentrically-disposed filtering-cylinders having interspace therebetween, scrapers taking against both walls of said interspace, a common support for the said scrapers, and means for urging said scrapers simultaneously inwardly and outwardly of said common support, substantially as described.

5. In a water-filter, the combination, with a casing, of a plurality of filtering-cylinders concentrically disposed in the casing, a scraper-frame having projections taking to inside the inner cylinder to outside the outer cylinder and between cylinders, cleaners secured to the said projections, and means for rotating said projections and cleaners concentrically of all cylinders.

6. In a water-filter, the combination, with a containing-casing, a filtering-cylinder therein, a cleaner-frame, cleaners supported thereby, an annular rack on said cleaner-frame intermediate of its length within said casing, a pinion in said casing having connection with said pinion for rotating said cleaner-frame and cleaners within said casing.

7. In a water-filter, the combination, with a containing-casing, a filtering-cylinder therein, a cleaner-frame, cleaners supported thereby, an annular rack on said cleaner-frame within said casing, a pinion in said casing meshing in said rack, operating means outside said casing connecting with said pinion for rotating said cleaner-frame and cleaners within said casing, and rolling bearing between said cleaner-frame and casing.

8. In a water-filter, the combination of a casing, a filtering-cylinder, a scraper-support, a scraper movably supported thereby, bell-crank levers relatively located longitudinally of said scraper, and tension means extending longitudinally of said scraper between the said bell-crank levers acting for urging the ends of said bell-crank levers toward the scraper for urging the latter against the filtering-cylinder, substantially as described.

9. In a water-filter, the combination with a casing of a plurality of concentrically-disposed filtering-cylinders therein, an inverted basket-shaped scraper-frame therefor, scrapers on said scraper-frame to the inside of said collective filtering-cylinders and between filtering-cylinders, an annular rack on said scraper-frame, a pinion meshing into said rack, all within said casing, and operating means outside said casing connecting with said pinion for operating said scraper-frame, substantially as described.

10. In a water-filter, the combination with a casing, of a plurality of concentrically-disposed filtering-cylinders therein and an inverted-basket-shaped scraper-frame therefor, scrapers on said scraper-frame to the inside and to outside of said collective filtering-cylinders and between filtering-cylinders, an annular rack on said scraper-frame, a pinion meshing said rack, all within said casing, and operating means outside said casing connecting with said pinion for operating said scraper-frame, a pair of bell-crank levers for said respective scrapers having pivotal connection on said scraper-frame, each of said bell-crank levers having a toe and a heel, said heels connected by a coil-spring for urging said toes toward the scraper and the scraper toward its cylinder, substantially as described.

11. In a water-filter, the combination of a casing, a plurality of concentrically-disposed filtering-cylinders and an inverted-basket-shaped scraper-frame therefor in said casing, scrapers on said scraper-frame to the inside and to outside of said collective filtering-cylinders and between filtering-cylinders, an annular rack on said scraper-frame, a pinion meshing said rack, means outside said casing connecting with said pinion for operating said scraper-frame, a pair of bell-crank levers for said respective scrapers having pivotal connection with said scraper-frame, each of said bell-crank levers having a toe and a heel, said heels connected by a coil-spring for urging said toes toward the scraper and the scraper toward its cylinder, and means for adjusting said coil-spring, substantially as described.

12. In a water-filter, the combination of a casing, a plurality of concentrically-disposed filtering-cylinders therein, an inverted-basket-shaped scraper-frame therefor, scrapers on said scraper-frame to inside and to outside said collective filtering-cylinders and between filtering-cylinders, an annular rack for said scraper-frame, a pinion meshing said rack, means outside said casing connecting with said pinion for operating said scraper-frame, a pair of bell-crank levers for said respective scrapers having pivotal connection with said scraper-frame, each of said bell-crank levers having a toe and a heel, said heels connected by a coil-spring, said scraper-frame having an annular groove adjacent said rack for accommodating said pinion, substantially as described.

13. In a water-filter, the combination with a casing, a plurality of concentrically-disposed filtration-cylinders therein, an inverted-basket-shaped scraper-frame, scrapers thereon to inside and to outside of said collective filtering-cylinders and between filtering-cylinders, means for urging said scrapers toward their respective cylinders, means for rotating said scraper-frame, and a rotating supply-pipe having outlet-opening projected at an angle to the perpendicular, substantially as described.

In testimony whereof I have hereunto subscribed my name in the presence of two subscribing witnesses.

MIRABEAU NORMAN LYNN.

Witnesses:
HENRY N. BAUER,
JOHN B. HELWIG.